United States Patent Office 3,092,147
Patented June 4, 1963

3,092,147
DEVICE FOR REGULARIZING THE DISTRIBUTION OF A FLUID
André Huet, 48 Avenue du President Wilson, Paris 16, France
Filed Apr. 19, 1960, Ser. No. 23,282
Claims priority, application France Apr. 21, 1959
1 Claim. (Cl. 138—37)

A problem which frequently arises in technical applications consists in distributing a fluid, after its arrival through a main conduit having a large section, between a number of sub-conduits having smaller sections, each sub-conduit being necessarily supplied in a manner strictly identical to the other conduits. A problem of this kind arises, for example, in the case of the fluid which passes out of a nuclear reactor and which is required to be conveyed into a plurality of identical boilers which must be supplied with hot fluid under strictly the same conditions in order to operate in the same manner. If no special precaution is taken, it can happen that, depending on the configuration of the main conduit, certain sub-conduits are in a priviliged position with respect to the other sub-conduits and are therefore better assisted, or are under a handicap with respect to the other sub-conduits, as regards the fluid with which they are supplied.

The present invention has for its object a device which provides a means of equalizing the distribution of a fluid between a number of sub-conduits and this device consists in mounting, at the point of the coupling between the sub-conduits and the main conduit, a wall of revolution having a convergent-divergent shape, preferably partitioned internally, in which one portion of the dynamic energy of the fluid is transformed into static energy. In this manner, the resulting braking effect corrects the flow of fluid in the sub-conduits and places them all under the same conditions with respect to the flow of fluid circulating in the main conduit.

The description which follows below with reference to the attached drawings, which are given by way of example only and not in any sense by way of limitation, will make it quite clear how the present invention may be carried into effect.

Figure 1:
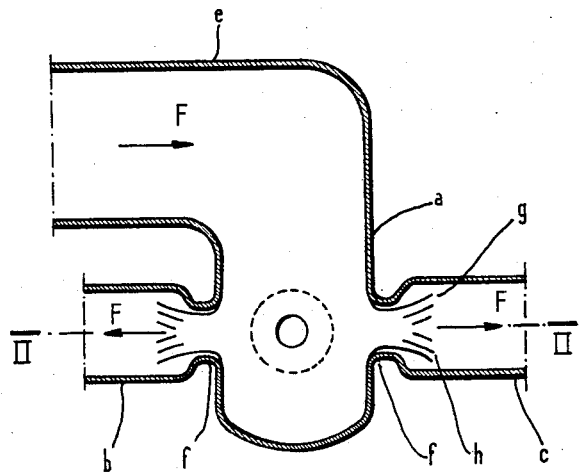
FIG. 1 illustrates in cross-section, by way of example, a main conduit to which three sub-conduits are coupled.
Figure 2:
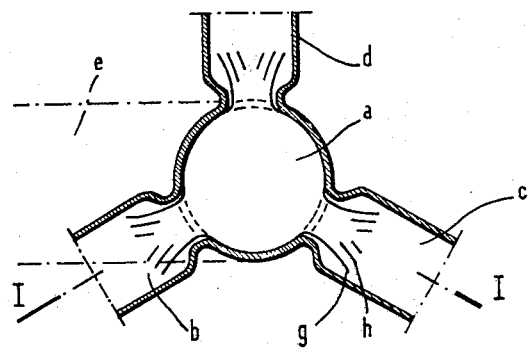
FIG. 2 is a cross-section taken along the line II—II of FIG. 1, which was a cross-section broken away along the line I—I of FIG. 2.

The problem which is illustrated by the drawing consists in coupling to the main conduit $a$, three sub-conduits $b$, $c$, $d$ of equal size, mounted for example at the same level and at the apex of an equilateral triangle, along the periphery of the conduit $a$. In the case in which the main conduit $a$ forms a sharp bend, such as the bend $e$ illustrated in the drawing, before arriving at the points of junction, it is quite obvious that the fluid which arrives in the direction of the arrow F will be such as to prove advantageous to the sub-conduit $c$, to the detriment of the sub-conduit $b$, by virtue of the fact that the fine streams of fluid are compressed by the change of direction on the wall of the conduit $a$ located in the vicinity of the sub-conduit $c$.

In accordance with the present invention, the pipe-collars such as $f$ which are formed on the wall of the conduit $a$ for the coupling of the sub-conduits, are of a smaller diameter than that of the sub-conduits, and these latter are also narrowed at their extremities so that the section of the coupling or joint has a necked portion of smaller diameter as compared with that of the sub-conduits. This advantageous arrangement is however not absolutely essential to the effective application of the present invention, and the characteristic feature of the invention consists in arranging in the interior of the coupling a convergent-divergent body of revolution $g$, in which distribution partitions $h$, also of revolution, are preferably provided as illustrated in the drawing. Consequently, the fluid which circulates in the direction of the arrows F has its dynamic energy converted in the interior of these convergent bodies to static energy, that is to say, into pressure which is transmitted instantaneously. This conversion to pressure produces a braking effect, the intensity of which increases with the rate of flow in the sub-conduit system. If, therefore, a conduit system is favored, the braking due to the convergent-divergent body is large. If, on the other hand, a conduit system is adversely affected as a result of a local resistance (deposits, elbows, etc.), the braking effect is much less. This results in a spontaneous equilization of distribution among the various sub-conduit systems.

It will be readily understood that modifications of detail can be made in the embodiment of the present invention without thereby departing from the scope of the said invention. The sub-conduits can be of any desired number, while the dimensions of the convergent-divergent bodies can vary with respect to each other so as to graduate the braking or slowing-down effect, according to the position of the sub-conduit considered with respect to the changes of direction of the main conduit.

What I claim is:

A fluid-distribution device adapted to have fluid flow therethrough in a predetermined direction, comprising, in combination, a main conduit and a plurality of secondary conduits mounted in parallel on said main conduit, each of said secondary conduits being connected to said main conduit by a coupling of convergent-divergent shape, said coupling containing a body of revolution having a gradually decreasing and then a gradually increasing diameter with respect to linear translation down the center of said body whereby to define a venturi and being provided internally with radially spaced-apart coaxial partitions of frusto-conical shape and outwardly flared in the direction of flow of the fluid away from said main conduit.

References Cited in the file of this patent

UNITED STATES PATENTS

| | | |
|---|---|---|
| 1,882,845 | Horsman | Oct. 18, 1932 |
| 2,164,629 | Sibley | July 4, 1939 |
| 2,664,095 | Magni | Dec. 29, 1953 |
| 2,710,443 | Webb | June 14, 1955 |
| 2,735,664 | Gamble | Feb. 21, 1956 |
| 2,761,462 | Snyder | Sept. 4, 1956 |
| 2,864,588 | Booth et al. | Dec. 16, 1958 |